United States Patent
Armitage et al.

(10) Patent No.: US 6,374,303 B1
(45) Date of Patent: Apr. 16, 2002

(54) EXPLICIT ROUTE AND MULTICAST TREE SETUP USING LABEL DISTRIBUTION

(75) Inventors: Grenville John Armitage, Bridgewater, NJ (US); Eric W. Gray, Lee, NH (US); Zheng Wang, Holmdel, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/190,307

(22) Filed: Nov. 12, 1998

Related U.S. Application Data

(60) Provisional application No. 60/065,772, filed on Nov. 17, 1997.

(51) Int. Cl.[7] .................. G06F 15/173; H04L 12/28; H04L 3/26
(52) U.S. Cl. ....................... 709/242; 370/390
(58) Field of Search ................. 709/238, 242; 370/390, 408; 710/131

(56) References Cited

U.S. PATENT DOCUMENTS

| | | | | |
|---|---|---|---|---|
| 5,991,300 A | * | 11/1999 | Tappan | 370/392 |
| 5,996,021 A | * | 11/1999 | Civanlar et al. | 709/238 |
| 6,009,097 A | * | 12/1999 | Han | 370/395 |
| 6,055,561 A | * | 4/2000 | Feldman et al. | 709/200 |
| 6,041,057 A | * | 5/2000 | Stone | 370/397 |
| 6,130,889 A | * | 10/2000 | Feldman et al. | 370/397 |
| 6,185,213 B1 | * | 2/2001 | Katsube et al. | 370/397 |
| 2001/0012295 A1 | * | 8/2001 | Wilford | 370/392 |

OTHER PUBLICATIONS

Seagall, A., et al., Reliable Multi–User Tree Setup with Local Identifiers, INFOCOM '92, IEEE, vol. 3, pp. 2096–2106, May 1992.*

Cohen, R., et al., Label Swapping Routing with Self–Termination, INFOCOM '93, IEEE, vol. 1, pp. 90–97, Apr. 1993.*

Acharya, A. et al., IP Multicast Support in MPLS, Proc. of ATM Workshop, 1999, IEEE, pp. 211–218, May 1999.*

Awduche, D., MPLS and Traffic Engineering in IP Networks, IEEE Communications Magazine, pp. 42–47, Dec. 1999.*

* cited by examiner

Primary Examiner—Zarni Maung
Assistant Examiner—Andrew Caldwell
(74) Attorney, Agent, or Firm—Joseph E. Funk

(57) ABSTRACT

What is disclosed is an arrangement of field of label augmented, multi-protocol routing of data packets in a network utilizing fixed length labels that are negotiated between adjacent label routing routers in the network. Portions of each routing label may be assigned by both upstream and downstream routers in the network. Routing labels are used in lieu of conventional address headers to route data packets through said network; and by using routing labels the routers have more flexibility in routing data packets through said network and can use network links between routers that normally carry less traffic.

9 Claims, 11 Drawing Sheets

FIG. 7

LDP MEE FORMAT IS AS SHOWN

```
 0                   1                   2                   3
 0 1 2 3 4 5 6 7 8 9 0 1 2 3 4 5 6 7 8 9 0 1 2 3 4 5 6 7 8 9 0 1
+-+-------------------+-------------------------------+
|X|       TYPE        |            LENGTH             |
+-+-------------------+-------------------------------+
|                       VALUE...                      |
+-----------------------------------------------------+
|                         ...                         |
+-----------------------------+-----------------------+
|          ...VALUE           |       PAD (0'S)       |
+-----------------------------+-----------------------+
```

FIG. 8

2.2.1 NULL MEE

DESTINATION FORWARDING EQUIVALENCY (DFE) MEE

```
 0                   1                   2                   3
 0 1 2 3 4 5 6 7 8 9 0 1 2 3 4 5 6 7 8 9 0 1 2 3 4 5 6 7 8 9 0 1
+-+-------------------+-------------------------------+
|X|       TYPE        |            LENGTH             |
+-+----------+--------+-------------------------------+
| PREFIX LEN |    DESTINATION PREFIX (VARIABLE LENGTH) |
+------------+----------+------------------------------+
|      PREFIX (CONT.)   |         PAD (0'S)            |
+-----------------------+------------------------------+
```

FIG. 9B

MULTICAST FORWARDING EQUIVALENCY (MFE) MEE

```
 0                   1                   2                   3
 0 1 2 3 4 5 6 7 8 9 0 1 2 3 4 5 6 7 8 9 0 1 2 3 4 5 6 7 8 9 0 1
```

| X | TYPE | LENGTH |
|---|------|--------|
| MULTICAST GROUP ADDRESS | | |

FIG. 9C

SOURCE-QUALIFIED MULTICAST FORWARDING EQUIVALENCY (SMFE) MEE

```
 0                   1                   2                   3
 0 1 2 3 4 5 6 7 8 9 0 1 2 3 4 5 6 7 8 9 0 1 2 3 4 5 6 7 8 9 0 1
```

| X | TYPE | LENGTH |
|---|------|--------|
| PREFIX LEN | SOURCE PREFIX (VARIABLE LENGTH) | |
| PREFIX (CONT.) | PAD (0'S) | |
| MULTICAST GROUP ADDRESS | | |

FIG. 9D

SOURCE-DESTINATION FORWARDING EQUIVALENCY (SFE) MEE

```
 0                   1                   2                   3
 0 1 2 3 4 5 6 7 8 9 0 1 2 3 4 5 6 7 8 9 0 1 2 3 4 5 6 7 8 9 0 1
```

| X | TYPE | LENGTH |
|---|------|--------|
| PREFIX LEN | DESTINATION PREFIX (VARIABLE LENGTH) | |
| PREFIX (CONT.) | PAD (0'S) | |
| PREFIX LEN | SOURCE PREFIX (VARIABLE LENGTH) | |
| PREFIX (CONT.) | PAD (0'S) | |

FIG. 10

2.2.3 EXPLICIT ROUTE MEE

```
 0                   1                   2                   3
 0 1 2 3 4 5 6 7 8 9 0 1 2 3 4 5 6 7 8 9 0 1 2 3 4 5 6 7 8 9 0 1
```

| X | TYPE | LENGTH |
|---|---|---|
| ADDRESS LENGTH (BITS) | | RESERVED |
| ADDRESS 1 | | |
| ⋮ | | |
| ADDRESS 1 (CONT.) | | ADDRESS 2 |
| ⋮ | | |
| ADDRESS N (CONT.) | | PAD (0'S) |

FIG. 11

2.2.4 TRAVERSAL LIST MEE

```
 0                   1                   2                   3
 0 1 2 3 4 5 6 7 8 9 0 1 2 3 4 5 6 7 8 9 0 1 2 3 4 5 6 7 8 9 0 1
```

| X | TYPE | LENGTH |
|---|---|---|
| ADDRESS LENGTH (BITS) | | RESERVED |
| ADDRESS 1 | | |
| ⋮ | | |
| ADDRESS 1 (CONT.) | | ADDRESS 2 |
| ⋮ | | |
| ADDRESS N (CONT.) | | PAD (0'S) |

FIG. 12

2.2.5 AUTHENTICATION MEE

```
 0                   1                   2                   3
 0 1 2 3 4 5 6 7 8 9 0 1 2 3 4 5 6 7 8 9 0 1 2 3 4 5 6 7 8 9 0 1
 0                   1                   2                   3
 0 1 2 3 4 5 6 7 8 9 0 1 2 3 4 5 6 7 8 9 0 1 2 3 4 5 6 7 8 9 0 1
```

| X | TYPE | LENGTH |
|---|------|--------|
| AUTHENTICATION TYPE |||
| AUTHENTICATION TYPE |||

FIG. 13

2.2.6 VENDOR SPECIFIC MEE

```
 0                   1                   2                   3
 0 1 2 3 4 5 6 7 8 9 0 1 2 3 4 5 6 7 8 9 0 1 2 3 4 5 6 7 8 9 0 1
```

| X | TYPE | LENGTH | |
|---|------|--------|---|
| | VENDOR ID | | DATA... |
| DATA (CONTINUED) ||||

FIG. 14A

NEIGHBOR LIST MEE AS FOLLOWS

```
 0                   1                   2                   3
 0 1 2 3 4 5 6 7 8 9 0 1 2 3 4 5 6 7 8 9 0 1 2 3 4 5 6 7 8 9 0 1
```

| X | TYPE | LENGTH |
|---|------|--------|
| | ID 1 | |
| | ⋮ | |
| | ID N | |

FIG. 14B

LDP NEIGHBOR NOTIFICATION FORMAT

```
 0                   1                   2                   3
 0 1 2 3 4 5 6 7 8 9 0 1 2 3 4 5 6 7 8 9 0 1 2 3 4 5 6 7 8 9 0 1
```

| COMMON HEADER |
|---|
| NEIGHBOR LIST MEE (VARIABLE LENGTH) |
| ADDITIONAL MESSAGE EXTENSION ELEMENTS (IF ANY) |

LDP TEARDOWN FORMAT

LDP TEARDOWN ACKNOWLEDGE FORMAT 2.7 LDP ERROR

EXPLICIT ROUTE AND MULTICAST TREE SETUP USING LABEL DISTRIBUTION

RELATED APPLICATION

This application is related to U.S. Provisional Patent Application No. 60/065,772, entitled "Explicit Route And Multicast Tree Setup Using Label Distribution", filed on Nov. 17, 1997.

FIELD OF THE INVENTION

This invention relates to the field of label augmented, multi-protocol routing of data packets in a network.

BACKGROUND OF THE INVENTION

In existing data networks, data packets have addresses attached thereto used to route the data packets over "hops" between a source and a destination router in the network. These addresses are assigned at each router, indicating the path of the next hop, and the addresses typically contain more information than is needed.

Multi-Protocol Label Switching (MPLS) provides for more efficient data forwarding based on the use of fixed size labels in making forwarding decisions. This mechanism is based on routing topology.

SUMMARY OF THE INVENTION

A mechanism and method is described by which Label Switched Paths (LSPs) can be explicitly established using a defined distribution protocol to meet requirements of users and networks. In particular, a negotiative protocol is defined for supporting Label Distribution in Multi-Protocol Label Switching (MPLS). This protocol allows for explicit route label setup, loop-free multicast tree setup, and label value negotiation.

The basic idea is to specify portions of a label which are defined by the upstream neighbor in an adjacent pair of Label Switching Routers (LSRs). The portion of the label which is assigned by the upstream neighbor is defined as a bit mask which indicates those portions of the label which remain to be assigned by the downstream neighbor. If all bits are zero, the label is fully determined by the upstream neighbor, otherwise any bit in the mask is set-able by the downstream neighbor. The range of set-able addresses may be further refined through the use of generic extensions to the protocol.

Multicast services may be optimized as a result of being able to allocate flow-classification labels from the source toward the destination (upstream allocation). Other applications of traditional IP Routing, such as Quality of Service routing, can be greatly augmented by the ability to establish a label switched path across specific routers. Our proposal embodies mechanisms to accomplish these aims.

This invention can be used with any media to be used for MPLS or any other form of label-based multi-protocol routing. As an example, the present invention may be incorporated specifically for IP routing support in access multiplexers or other network components.

DESCRIPTION OF THE DRAWING

The invention will be better understood upon reading the following Detailed Description in conjunction with the drawing in which:

FIGS. 6–18 show the formats used for the various label distribution protocol messages.

DETAILED DESCRIPTION

This document describes the specification of a generic Label Distribution Protocol (LDP) for Multi-Protocol Label Switching (MPLS). Its purpose is to define those parts of LDP that are media/technology independent.

1. MPLS Protocol

Figure 1:
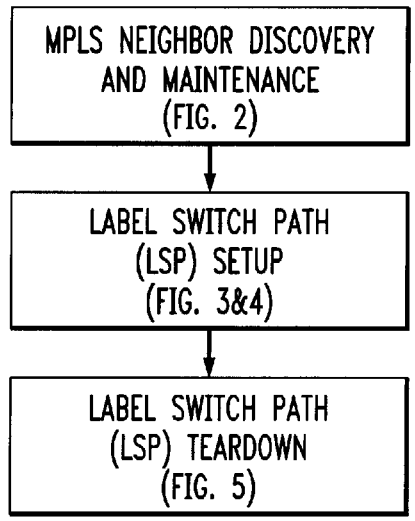
FIGS. 1 through 5 are simplified flowchart diagrams illustrating the steps associated with the generic label distribution protocol.

Protocol Overview (FIG. 1)

FIG. 1 herein provides a brief overview of the necessary protocol interactions required of a generic Label Distribution Protocol (LDP) of the type taught by the present invention. The necessary interactions shown in FIG. 1 are expanded in FIGS. 2 through 5, including the present invention, and are described with reference to those Figures. Accordingly, FIG. 1 is not described here.

Figure 2:
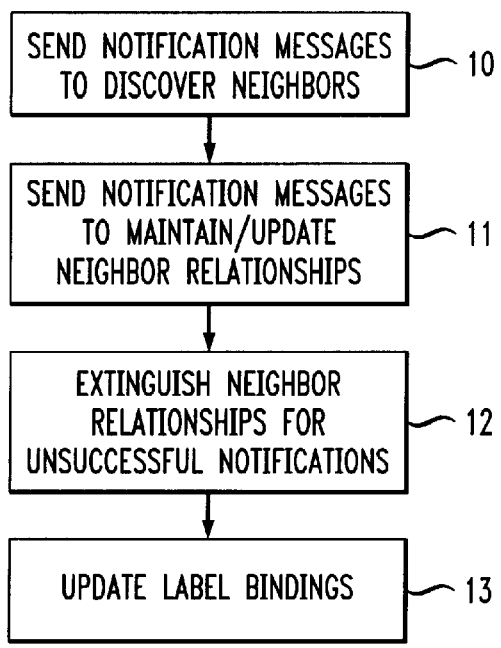

MPLS Neighbor Discovery and Maintenance (FIG. 2)

A Multi-Protocol Label Switch (MPLS) is intended to be a simple extension to L3 technologies, such as IP, to allow for simplified forwarding syntax. Instead of making a forwarding decision with each L3 datagram—based on the entire contents of the L3 header—a forwarding equivalency is determined for classes of L3 datagrams and a fixed-length label is negotiated between neighboring Label Switched Routers (LSRs) along Label Switch Paths (LSPs) from ingress to egress per the teaching of the present invention. Thus, forwarding for a class of L3 datagrams is determined at each LSR during LSP setup and the per-datagram forwarding process is reduced to label-lookup, label swap and forwarding port selection.

To do this, routers with label switching capabilities must be able to determine which of their neighboring peers are similarly capable and, in order to ensure reliable continued operation, the state of each neighbor's label-switch engine. This is accomplished by sending notification messages 10 to neighboring routers to discover if they are similarly capable. This protocol assumes that the state of the label-switch and route engines is not necessarily identical, that is continued peer-level communication with adjacent routers known earlier to be LSR—enabled is not sufficient evidence of the continued operation of LSR function in the adjacent router.

The local LSR (Label Switched Router) sends notification messages 10 periodically (once in a notification period) to each routing neighbor until it has both sent and received such a notification for that neighbor. This notification message 10 may be sent periodically thereafter in order to maintain the neighbor relationship 11. Once a neighbor relationship has been established, normal LDP (Label Distribution Protocol) control traffic received from a neighbor within the notification period is sufficient to maintain the relationship. After three notification periods have elapsed without receiving any LDP protocol messages from a neighboring LSR, the neighbor relationship is considered to have ended 12 and any LDP label bindings acquired from that neighbor are removed 13. It may be necessary to un-splice and remove bindings for other neighbors as a result of ending a neighbor relationship.

Figure 3:
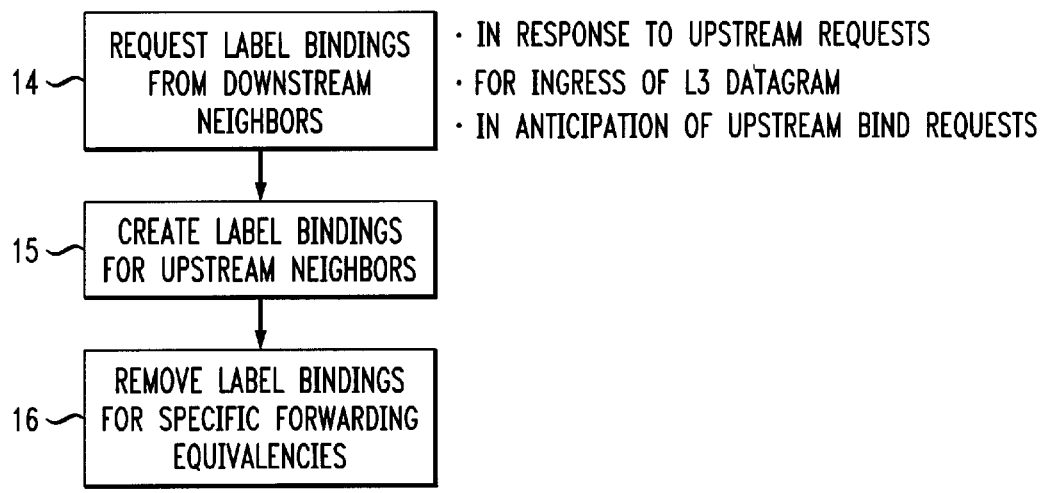

LSP (Label Switch Paths) Setup—Establish/Maintain Label Associations (FIG. 3)

An LSR (Label Switched Router) needs to establish and maintain label-associations with the routing neighbors which it knows are LSR capable at any given time in order to provide MPLS functionality across negotiated LSPs. The local LSR may request label bindings 14 (associations of a label with a forwarding equivalency) from downstream neighbors (i.e.—those neighbors advertising reachability for L3 datagrams in that forwarding equivalency), it may create label bindings 15 for its up-stream neighbors (possibly as a result of a bind request) and it may remove bindings 16 (teardown an LSP) associated with specific forwarding equivalencies with any of its neighbors.

The local LSR (Label Switched Router) may request a label bind 14 from downstream neighbors corresponding to forwarding equivalencies for which it received bind requests from upstream neighbors, for which it will ingress matching L3 datagrams or in anticipation of LDP bind requests from upstream neighbors. Until receiving a corresponding label bind, the local LSR forwards datagrams using routing (egressing corresponding LSPs if necessary).

Figure 4:
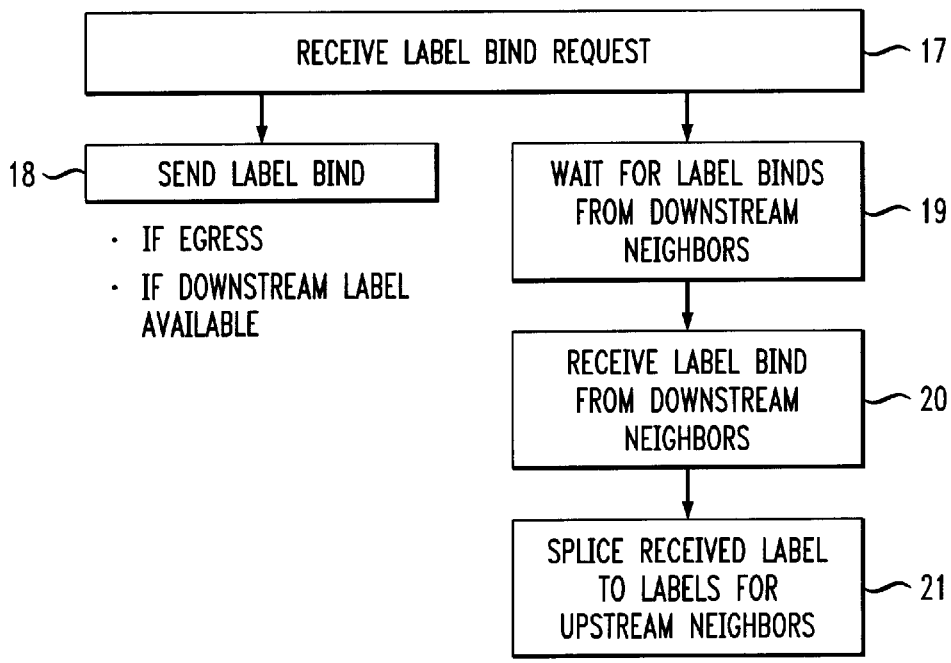

LSP (Label Switch Paths) Setup—Receipt of Label Bind Requests (FIG. 4)

On receiving a bind request 17 from an upstream neighbor, an LSR (Label Switched Router) may respond with a label bind immediately 18 or it may wait for corresponding label binds from its downstream neighbors 19. The local LSR may provide a label bind immediately if it: (1) has corresponding downstream labels, or (2) it will act as egress for the corresponding LSP. If the LSR does not provide an immediate bind, it may continue to receive unlabeled L3 datagrams from the requesting neighbor until such time as it does provide the requested bind 20. If the LSR has elected to wait for corresponding downstream label binds, it may create a label bind for upstream neighbors at a later time (when it has obtained these binds and spliced them 21 with the labels it will use in binds to upstream neighbors).

On receiving a label bind from a downstream neighbor 20, an LSR may immediately splice this label to labels it has provided, or will provide, to its upstream neighbors 21.

Any LSR receiving unlabeled L3 datagrams either acts as ingress to a corresponding LSP (classifying the L3 datagram, assigning and attaching an appropriate label and forwarding the labeled L3 datagram) or it forwards the datagram using routing.

An LSR (Label Switched Router) must handle unlabeled L3 datagrams received from routing neighbors until successful in negotiating labels with those neighbors; thus a downstream neighbor is encouraged to provide label binds to its upstream neighbors.

Any LSR receiving labeled datagrams for which it has an unspliced label binding (port-label match but the LIB entry is incomplete) must act as egress for these datagrams.

Figure 5:
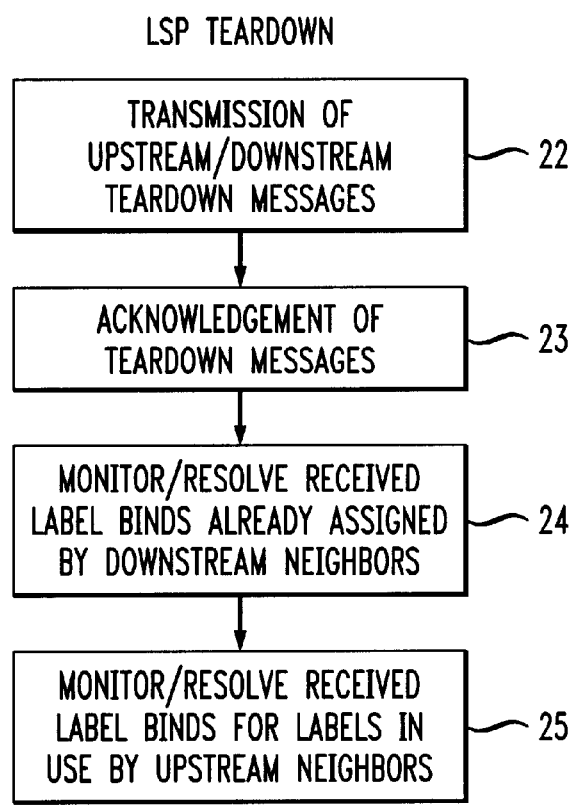

LSP (Label Switch Paths) Teardown (FIG. 5)

If, for some reason (such as a routing change), labels associated with a forwarding equivalence are not valid for, or will not be supported by, the local LSR (Label Switched Router), the local LSR must invalidate the previous label bind by sending a label teardown message 22 to its corresponding upstream neighbors.

If the local LSR will no longer be using a label it has received from a downstream neighbor, it must send a teardown message to that neighbor 23. This might happen, for example in the case where the local LSR asked for the label in a bind request, received it in a label bind and no longer requires this label. This is required in order to eliminate associated unused labels.

Teardown messages are sent in a reliable way in order to ensure that associated label bindings are released. When an LSR receives an explicit teardown, it must acknowledge the message using a teardown acknowledge 23. This ensures that the local LSR is able to free-up corresponding resources and, in the upstream case, does not continue to receive L3 datagrams that are incorrectly labeled.

Implicit teardown occurs when the local LSR receives a bind request (label bind) from a neighboring LSR containing the same label as was used in a previous binding with the same neighbor 24, 25. Implicit teardown may occur as a result of duplicate bind request (label bind) messages. In general, use of implicit teardown is undesirable behavior.

On receiving a label bind with a label already assigned by the downstream neighbor 24, the local LSR (Label Switched Router) performs a level of checking to determine if the label identifies the same binding. If it does, an appropriate error is returned. If the label bind contains a hop-count that differs from that used in an earlier label bind but otherwise identifies the same binding, the local LSR removes the previous LIB entry and processes the label bind.

On receiving a bind request specifying a label already in use for the upstream neighbor 25, the local LSR performs a level of checking to determine if it identifies the same binding. If it does not, a label bind with an appropriate status is returned. Otherwise, the local LSR removes the corresponding LIB entry and processes the bind request.

Other

An LSR receiving labeled datagrams for which it has no label binding may look beyond the label to determine if this label is the bottom of the stack and act as egress for those datagrams for which this is the case but must otherwise discard these datagrams. In this case, a teardown must be sent to the upstream neighbor for the unknown label.

Except for teardown messages, reliable delivery of LDP (Label Distribution Protocol) messages is not required by the protocol. Thus, explicit acknowledgment is defined for teardown messages only.

Bindings may, as a local matter, be aged out using a very long time period. If this is done, in order to ensure that labels are eventually removed when all other efforts to remove them have somehow failed, labels should be associated with individual expiry times (perhaps using randomization) in order to reduce clumping of protocol activity.

2. LDP (Label Distribution Protocol) Messages (FIGS. 6–18)

Different LDP Messages utilized in implementing the present invention are defined below. The intent is that several messages may be combined in a single datagram to minimize the CPU processing overhead associated with input/output. Encapsulation for datagrams used must be defined in specific technology LDP specifications.

Sections 2.3 through 2.7 describe details of the six following listed messages making up the generic MPLS (Multi-Protocol Label Switching) protocol, consisting of a neighbor notification message (used to drive neighbor discovery and adjacency state), an error message and four messages associated with label switch path setup and teardown (label distribution and teardown). The specific messages are:

LDP Neighbor Notification Format—FIG. 14B (section 2.3).

Figure 15:
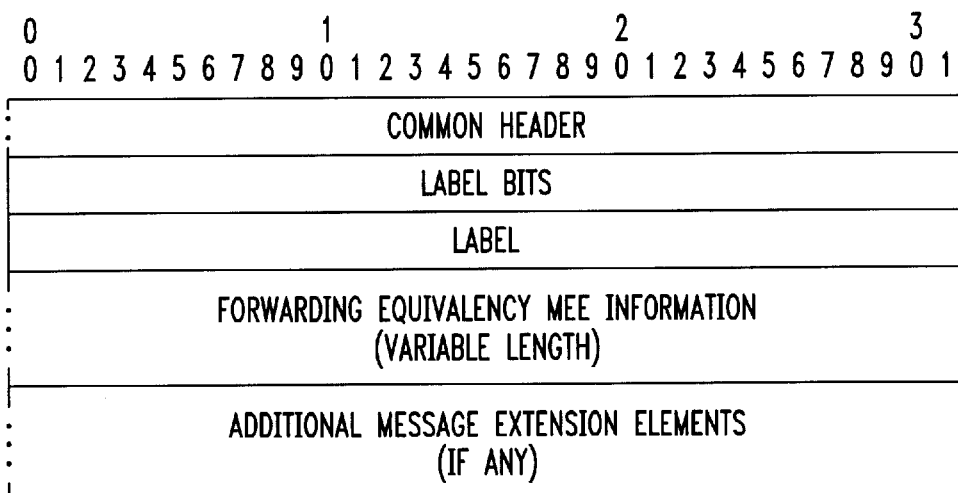

LDP Bind Request—FIG. 15 (section 2.4).

Figure 16:
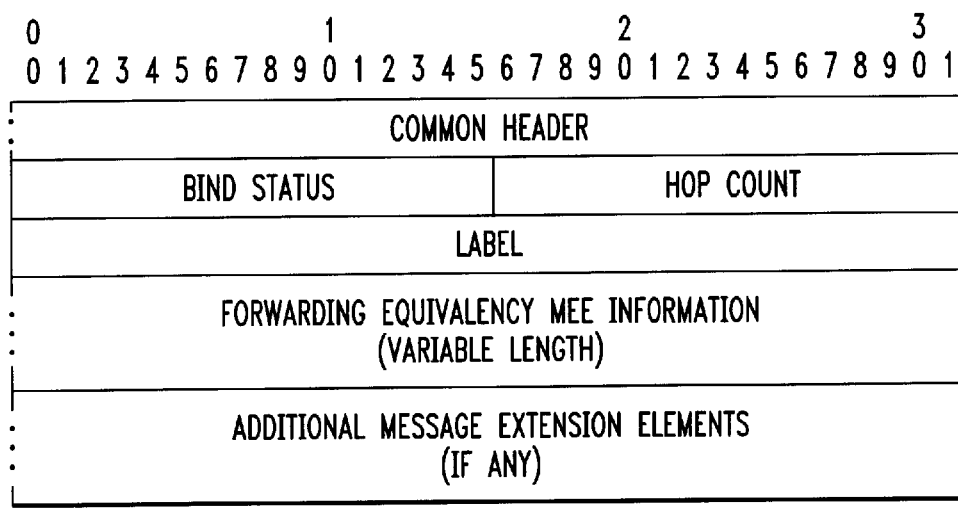

LDP Label Bind—FIG. 16 (section 2.5).

Figure 17A:
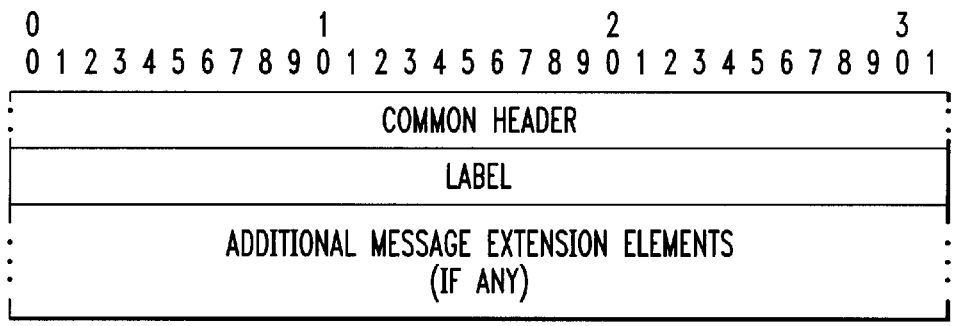

LDP Teardown Format—FIG. 17A (section 2.6).

Figure 17B:
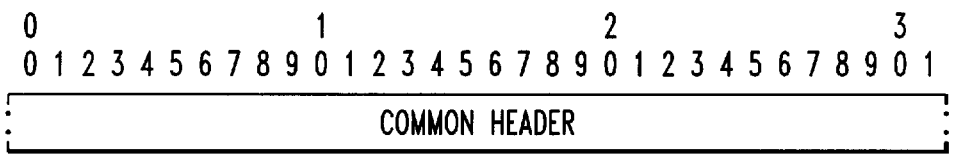

LDP Teardown and Acknowledge Format—FIG. 17B (section 2.6).

Figure 18:
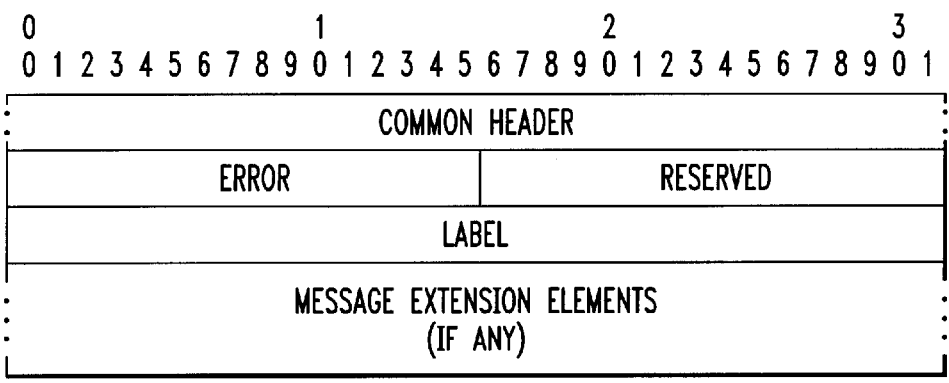

LDP Error—FIG. 18 (section 2.7).

Section 2.1 describes the details of the message header common to all MPLS (Multi-Protocol Label Switching) messages (FIG. 6), section 2.2 describes the format of Message Extension Elements (FIG. 7), section 2.3 describes the LDP Neighbor Notification Format (FIG. 14B), section 2.4 describes the Label Distribution Protocol Bind Request (FIG. 15), section 2.5 describes the LDP Label Bind (FIG. 16), section 2.6 describes the LDP Teardown and Acknowledge (FIGS. 17A & 17B), section 2.7 describes the LDP Error (FIG. 18).

Figure 6:
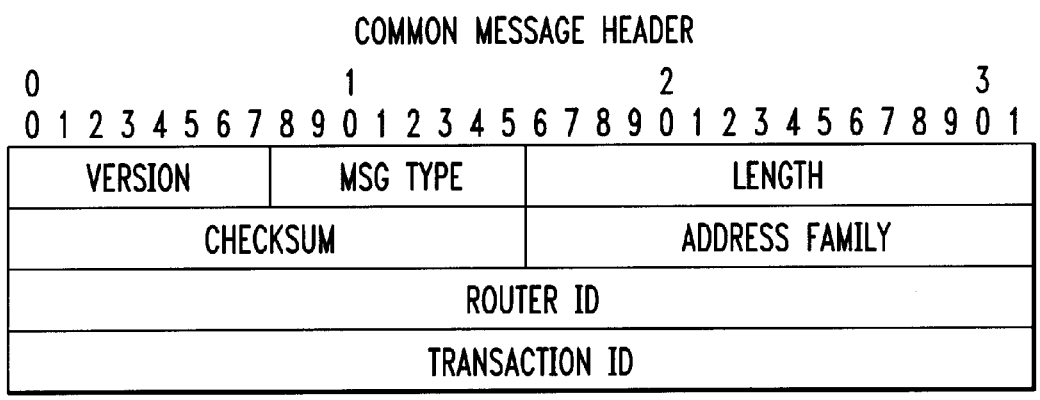

2.1 Common Message Header (FIG. 6)

This is a common message header for the six LDP message types listed below. The common message header contains the following fields that are shown in FIG. 6.

Version: LDP Version—set to 0x01 in this embodiment of the invention.

Msg. Type: Set to the type of this message. Types are as follows:

| Msg. Type | Message | |
|---|---|---|
| 0x01 | LDP Neighbor Notification | Sect. 2.3 |
| 0x02 | LDP Bind Request | Sect. 2.4 |
| 0x03 | LDP Label Bind | Sect. 2.5 |
| 0x04 | LDP Teardown | Sect. 2.6 |
| 0x05 | LDP Teardown Acknowledge | Sect. 2.6 |
| 0xFF | LDP Error | Sect. 2.7 |

Length: Length of this message, in octets, minus the 12 octets in this header.

Checksum: A checksum as known in the prior art and described in a paper by J. Postel entitled "INTERNET PROTOCOL", RFC 791, September 1981, except computed for the entire message, including header in the present invention. RFC 791 is available on the Internet at <http://info.internet.isi.edu:80/in-notes/rfc/files/rfc791.txt>.

Address Family: This 16 bit integer contains a value from ADDRESS FAMILY NUMBERS in Assigned Numbers that encodes the address family that the network layer addresses in this message are from. This provides support for multiple network protocols and corresponding address families. See a paper by J. Postel and J. Reynolds entitled "Assigned numbers" RFC 1700, October 1994, and available on the Internet at <http://info.internet.isi.edu:80/in-notes/rfc/files/rfc1700.txt>.

Router ID: The four-byte router identifier as defined by routing protocol(s).

Transaction ID: Used to consistently identify pending transactions. This ID is intended to be unique across all transactions currently pending at the local LSR (Label Switched Router) but may not be unique to pairs of LSRs in a neighbor relationship.

2.2 LDP Message Extension Element (MEE) Format (FIG. 7)

The LDP Message Extension Element Format message indicates the format for providing extensions to the many message types described in this Detailed Description.

LDP (Label Distribution Protocol) MEEs consist of data structured in four fields. In order the fields are X, Type, Length and Value. LDP MEE format is as shown: (FIG. 7)

X: Determines how a recipient should behave when it doesn't recognize the TLV Type. Required behaviors are:
X=0 Skip the MEE, continue processing the list.
X=1 Stop processing, silently drop the LDP message.
X=2 Stop processing, drop message, give error indication.
X=3 Reserved (currently treat as x=0).

Unless otherwise specified for MEEs in LDP messages below, the value of X is determined by the originating LSR as follows:

"0" if it is sufficient for any downstream (Bind Request), or upstream (Label Bind) LSR to be able to interpret the MEE;

"1" if it is sufficient that failure to interpret this MEE results in no further processing of the message that includes it;

"2" if it is necessary to receive an error indication from the first LSR that is unable to process this MEE.

Type: A 14 bit integer value encoding how Value is to be interpreted. A Type is defined for vendor specific MEEs (Message Extension Elements) (described in 2.2.6). Behavior of an LSR on processing an MEE with an unknown type is defined by X above. Type space is subdivided to encourage use outside the IETF as follows:

| | |
|---|---|
| 0 | Null MEE. |
| 0x0001–0x0FFF | Reserved for the IETF. |
| 0x1000–0x11FF | Allocated to the ATM Forum |
| 0x1200–0x37FF | Reserved for the IETF. |
| 0x3800–0x3FFE | Experimental use. |

Length: The length in octets of the value (not including X, Type and Length fields; a null extension will have only an extension header and a length of zero).

Value: An octet string containing information in a format defined for Type and having a length in octets of Length. The extensions list is terminated by the Null MEE, having Type=0 and Length=0.

2.2.1 Null MEE (FIG. 8)

The Null MEE is undefined, as depicted in FIG. 8, with type and length zero. It may be used to provide extended capability to the embodiment of the invention disclosed herein.

2.2.2 Forwarding Equivalency MEE (FIGS. 9A, 9B, 9C, 9D)

This message is an example of a Forwarding Equivalency Extensions for destination (FIG. 9A), multicast group address (FIG. 9B), source and multicast group address (FIG. 9C) and source-destination based forwarding equivalencies (FIG. 9D).

Destination Forwarding Equivalency (DFE) MEE (FIG. 9A)

Type: Type is set to 0x0001 in this embodiment of the invention.

Length: Length depends on the number of address prefixes on each data packet and the length of each.

Multicast Forwarding Equivalency (MFE) MEE (FIG. 9B)

Type: Type is set to 0x0002 in this embodiment of the invention.

Length: Length depends on the number of address prefixes on each data packet and the length of each.

Source-qualified Multicast Forwarding Equivalency (SMFE) MEE (FIG. 9C)

Type: Type is set to 0x0003 in this embodiment of the invention.

Length: Length depends on the number of address prefixes on each data packet and the length of each.

Source-destination Forwarding Equivalency (SFE) MEE (FIG. 9D)

Type: Type is set to 0x0004 in this embodiment of the invention.

Length: Length depends on the number of address prefixes on each data packet and the length of each.

2.2.3 Explicit Route MEE (FIG. 10)

The Explicit Route MEE message specifies the Label Switched Routers that are to be used in a Label Switched Path.

X: X is set to either one or two, in LDP (Label Distribution Protocol) messages, as processing of this MEE (Message Extension Element) is significant to message semantics. Whether or not an error is to be reported on failure to interpret this MEE is local to the originating LSR, if the MEE is included in a Bind Request. In a Label Bind, however, X must be set to two in this MEE such that bindings may be released if one of the listed LSRs is unable to interpret this MEE.

Type: Type is set to 0x0005 in this embodiment of the invention.

Length: Length depends on the number of address prefixes on each data packet and the length of each.

Address Length: Length in bits of each address in the list. All addresses in the list must be of the same length.

Address 1-N: Addresses of the LSRs (Label Switched Routers) which this LSP (Label Switch Paths) is to traverse. On Receipt, the first address should be an address of the local LSR. On transmittal, the first address should be an address of the next neighboring LSR in the intended LSP.

This MEE (Message Extension Element) may be included in Bind Request and Label Bind messages. Each LSR processing a message containing this MEE must:

(a) verify that the first address in the list corresponds to a local address associated with this LSR;

(b) construct a new MEE omitting the first address;

(c) include this new MEE in Bind Request (downstream) or Label Bind (upstream), with additional values and MEEs as required and send this message to the next addressed LSR in the explicit path.

Bind Requests with an Explicit Route MEE containing at least two addresses on receipt result in Bind Requests with one less address sent to the next downstream LSR neighbor. In the same way, Label Bind messages result in Label Binds to the next upstream neighbor.

If the only address present in the MEE is that of the local LSR (Label Switched Router), no further processing (beyond that of creating the binding) is required.

2.2.4 Traversal List MEE (FIG. 11)

This MEE (Message Extension Element) message may be included in Bind Requests in order to prevent rippling LDP messages in a loop (useful—for instance—in Multi-cast LSPs (Label Switch Paths) setup using upstream allocation).

X: X is set to one, in LDP (Label Distribution Protocol) messages, as processing of this MEE is significant to message semantics yet an error due to not being able to interpret this MEE should not result in an Error message.

Type: Type is set to 0x0006 in this embodiment of the invention.

Address Length: Length in bits of each address in the list. All addresses in the list must be of the same length.

Address 1-N: Addresses of the LSRs (Label Switched Routers) which this LSP has traversed. On Receipt, this list must not contain the address of this LSR (as defined for the address family in the Common Message Header. In the event that it does, the message containing this MEE (Message Extension Element) is silently dropped.

2.2.5 Authentication MEE (FIG. 12)

The Authentication MEE is used to validate that a neighboring router sending messages defining label switched paths is legitimate in order to protect the network from unauthorized equipment.

X: X is set to two, in LDP (Label Distribution Protocol) messages, as processing of this MEE is significant to message semantics and an error should be reported as a result of authentication failure.

Type: Type is set to 0x0007 in this embodiment of the invention.

Authentication Type: Identifies the authentication method in use. Current allowed values are:

1—Cleartext Password
2—Keyed MD5
3+—Reserved

Authentication Data: Contains the type-specific authentication information. For Cleartext Password Authentication, this field consists of a variable length password.

For Keyed MD5 Authentication, the Authentication Data contains the 16 byte MD5 digest of the entire NHRP packet, including the encapsulated protocol's header, with the authentication key appended to the end of the packet. The authentication key is not transmitted with the packet. The MD5 digest covers only the Common Message Header.

2.2.6 Vendor Specific MEE (Message Extension Element) (FIG. 13)

The Vendor Specific MEE is a compatibility extension that permits a user to add message extension elements to MEEs.

X: This field is assigned by the user of the system.

Type: Type is set to 0x3FFF in this embodiment of the invention.

Length: Length is literally the number of bytes in the MEE, less the length of the MEE header.

Vendor ID: 802 Vendor ID is assigned by the IEEE and is known in the prior art. See a paper by a paper by J. Postel and J. reynolds entitled "Assigned numbers" RFC 1700, October 1994, and available on the Internet at <ftp://ftp.isi.edu/in-notes/rfc1700.txt>.

Data: The remaining octets after the Vendor ID in the payload are vendor-dependent data.

Neighbor List MEE: See the description for FIG. 14A which applies here.

2.3 Neighbor List MEE (FIG. 14A) LDP Neighbor Notification Format (FIG. 14B)

The Neighbor List MEE header shown in FIG. 14A is part of the LDP Neighbor Notification Format shown in FIG. 14B.

Neighbor Notification messages are similar to those in the prior art and defined in a paper RFC 2334 by J. Luciani, et al entitled "Server Cache Synchronization Protocol" and available on the Internet at <http://info.internet.isi.edu:80/in-notes/rfc/files/rfc2334.txt>., that is, each notification contains the IDs of those neighbors heard from. The IDs are contained in a neighbor List MEE as follows: (FIG. 14A)

X: X is set to 2.

Type: Type is set to 0x0008 in this embodiment of the invention.

ID: The ID used for each LSR shall be the same as the Router ID for the associated routing engine.

LDP Neighbor Notification Format: (FIG. 14B)

Common Header: In the common header, Type is set to 0x01. Transaction ID is set to zero.

Neighbor List Message Extension Element (MEE): (FIG. 14A)

Formatted as described above. The Neighbor List contains the Ids of neighboring LSRs (Label Switched Routers) heard from. The local LSR—if originating the message—attaches a Neighbor List MEE containing its own ID. On receiving a Neighbor Notification message not containing its own ID, the local LSR appends its own ID to the list and sends a new Neighbor Notification message.

Additional Message Extension Elements: The Neighbor Notification may contain additional MEE (Message Extension Element) information. This information can have no bearing on processing the preceding portions of the message. Any interpretable MEEs may be included in Neighbor Notifications occurring as a result of processing this message. Non-interpretable MEEs must be so included. After all such additional MEEs (if any), a Null MEE must be appended. Neighbor Notification processing is further described in the state transition table in section 3 (LDP neighbor state transitions).

2.4 LDP (Label Distribution Protocol) Bind Request (FIG. 15)

The LDP Bind Request is the message via which a requesting Label Switched Router (LSR) may specify a range of valid labels to be used in association with a particular forwarding equivalency.

Common Header: In the common header, Type is set to 0x02 and Transaction ID is a locally unique (non-zero) identifier which the local LSR may use to pair this request to a corresponding subsequent Label Bind.

Label Bits: This field contains an integer in which binary 1 positions indicate the bits available for assignment in a label by the downstream neighboring LSR. The responding LSR should not assign labeling significance to any bit positions not set in this field. If this field is set to all ones, the downstream LSR is free to allocate any label for this request.

Label: A Label requested by the upstream (requesting) LSR (Label Switched Router). In the case where the Label Bits field is not all ones, this field defines values for bit positions not available for assignment by the downstream LSR. For example, a Label Bits field of all zeros indicates an upstream label allocation with the label requested exactly as defined by this field. This field is set equal to zero to indicate that downstream allocation of all available bit positions is desired.

Forwarding Equivalency MEE Information: This variable length field contains FEC-related information—for example—in a format defined in section 2.2.2 above, associated with this request. Only one Forwarding Equivalency MEE (Message Extension Element) may be included in each Bind Request.

Additional Message Extension Elements: The Bind Request message may contain additional MEE information intended to further qualify the semantics associated with this label negotiation. An example is inclusion of an Explicit Route MEE. After all such additional MEEs (if any), a Null MEE must be appended.

Bind Request messages may be satisfied by the local LSR if a label matching the restrictions (if any) of the Bind Request can be allocated and any of the following conditions are met:

(a) the local LSR is able to interpret all MEEs (Message Extension Elements) included in the Bind Request message and has a LIB entry with an exactly matching qualified forwarding equivalency;

(b) the local LSR is able to interpret all MEEs included in the Bind Request message and will act as egress for L3 datagrams arriving labeled for this qualified forwarding equivalency;

(c) the local LSR is able to find a bit-wise match in an associated cache for all uninterpretable MEEs in a single LIB entry which otherwise matches interpretable portions of the Bind Request.

If the Bind Request can be satisfied by the local LSR, the LSR creates a binding, splices it in the LIB, builds a Label Bind message as described in section 2.5 below and sends it to the requesting neighbor.

If the Bind Request cannot be satisfied for reasons of labeling restrictions, a Label Bind is constructed as described below, with an appropriate status value and possible labeling problem information.

Otherwise, the local LSR (Label Switched Router) sends a corresponding Bind Request to downstream neighbors (possibly restricted by qualifications in the pending Bind Request—e.g. Explicit Route MEE) including at least all semantically significant and uninterpretable MEEs (Message Extension Elements).

The local LSR preserves state information relating pending upstream (received) Bind Requests to pending downstream (sent) Bind Requests including a mapping of corresponding Transaction IDs.

2.5 LDP Label Bind (FIG. 16)

The LDP Label Bind message contains a valid label and the forwarding equivalency associated with it.

Common Header: In the common header, Type is set to 0x03. Transaction ID is set equal to the transaction ID in the corresponding Bind Request, if any, otherwise, it is set equal to zero.

Bind Status: This 16 bit integer contains the status of the binding. A non-zero value here indicates that the LDP (Label Distribution Protocol) Bind Request associated with the included Request ID was unsuccessful for reasons indicated by the status value. This field is not significant and must be set to zero if this message is not the result of a LDP Bind Request message.

Typical status values are:

0x01—Insufficient Resources

0x02—Invalid Labeling Restrictions

0x03—No suitable egress found

0x04—Label in use or may not be assigned

0x09—Authentication Failure

Hop Count: This is set to indicate the Hop Count reported to this LSR (Label Switched Router) by its downstream neighbors (relative to this LSP) plus the number that this LSR would decrement TTL by for L3 datagrams on this LSP if these datagrams were being forwarded using L3 routing. The LSR assumes a downstream Hop Count of zero if it is the egress for this LSP.

Label: The Label associated with this message. If this field is non-zero in an unsuccessful binding, non-zero bit positions indicate invalid bit-values or assignment in the corresponding LDP Bind Request.

Forwarding Equivalency MEE (Message Extension Element) Information: This variable length field contains FEC-related information—for example—in a format defined in section 2.2.2 above, associated with this request. Only one Forwarding Equivalency MEE may be included in each Label Bind.

Additional Message Extension Elements: The Label Bind message may contain additional MEE information intended to further qualify the semantics associated with this label negotiation. After all such additional MEEs (if any), a Null MEE must be appended.

On receipt of a Label Bind with a zero Transaction ID, the local LSR may create a LIB entry binding the downstream label to a forwarding equivalency (with possible MEE qualification) and construct corresponding Label Bind messages and forward them to its upstream neighbors (potentially restricted by qualifications in the Label Bind—e.g. Explicit Route MEE) including at least semantically significant and all uninterpretable MEEs.

The local LSR may act as ingress to the corresponding LSP (Label Switch Paths) if it is able to interpret all MEEs (Message Extension Elements) included in the Label Bind message.

If the received Label Bind has a non-zero Transaction ID, the local LSR finds the corresponding Bind Request information. If the status code in the Label Bind is success, the local LSR may insert the new label in a LIB entry from Label Bind and, if the Transaction ID corresponds to a Bind Request from one or more upstream neighbors, create appropriate label(s) for inclusion in Label Bind Message(s) to upstream neighbor(s). If the Status is non-zero, processing is as follows:

(a) if there are no corresponding pending Bind Requests from upstream neighbors, the local LSR makes a local determination as to whether or not to repeat the Bind Request—based on the specific Status given;

(b) if there are corresponding pending Bind Requests from upstream neighbors, the action is determined using this table:

| Status | Action |
|---|---|
| 0x01\|0x03 | Accumulate Status from pending Bind Requests associated with upstream Bind Requests and, if no further pending Bind Requests exist, return a Label Bind with a Status code of 0x03. |
| 0x02\|0x04 | Make a local determination on whether or not to repeat the Bind Request using different values. In the event that Bind Request is not retried, return a Label Bind to upstream neighbors with associated pending Bind Requests using a Status code of 0x03. |
| Other: | Return a Label Bind for associated pending Bind Requests with this Status code to corresponding upstream neighbors. |

As described in section 2.4 above, an LSR (Label Switched Router) may make a local determination to satisfy Bind Requests of upstream neighbors in certain conditions. In the event that the local LSR is able to act as egress, it may do so rather than returning a Label Bind with a Status code of 0x03.

Receipt of a Label Bind is not a commitment to use it, hence no acknowledgment is required. However, if the local LSR is unable to use a label included in a Label Bind, it should respond with an appropriate LDP (Label Distribution Protocol) Error. Examples of why this might occur are:

(a) the current LSR has no upstream neighbors and is itself unable to act as ingress for the qualified forwarding equivalency (e.g. it is unable to interpret one or more MEEs);

(b) the label provided is not consistent with the hardware used by the downstream interface;

(c) the label provided is already bound to a different qualified forwarding equivalency for this interface;

(d) an error was detected in the Label Bind message.

Returning an Error message when appropriate allows the downstream neighbor to release invalid bindings and, potentially try again.

An LSR should report an LDP Error downstream if, processing of the Label Bind message results in a excessive hop-count, either as reported by an upstream LSR or as determined by the local LSR.

Excessive hop-count results when the incremented value of the hop-count field in the Label Bind exceeds a locally configured maximum. The default value for this maximum is 32.

2.6 LDP Teardown and Acknowledge (FIGS. 17A & 17B)

The LDP Teardown and Acknowledgement message provides reliable notification to a neighboring LSR that a teardown message has been received from that LSR.

LDP Teardown Format: (FIG. 17A)

Common Header: In the common header, Type is set to 0x04 and Transaction ID is a locally unique (non-zero) identifier which the local LSR may use to pair this message to a corresponding Teardown Acknowledge.

Label: The Label associated with this message. The value in this field is intended to reflect an existing label bound to the remaining contents of this message.

Additional Message Extension Elements (MEE): The Teardown message may contain additional MEE (Message Extension Element) information. This information can have no bearing on processing the preceding portions of the message. For example, inclusion of a Forwarding Equivalency MEE does not scope this message. Any interpretable MEEs may be included in Teardown messages which occur as a result of processing this message. Non-interpretable MEEs must be so included. After all such additional MEEs (if any), a Null MEE must be appended.

LDP Teardown Acknowledge Format: (FIG. 17B)

Common Header: In the common header, Type is set to 0x05. Transaction ID is set equal to the Transaction ID in the corresponding Teardown message.

When the local LSR (Label Switched Router) determines that a label or its corresponding LSP is no longer valid, it must send a Teardown message using reliable protocol. This is necessary because the local LSR only invalidates LIB entries on loss of neighbor, Error, timeout (on a configurable but, by default, very long cycle) and Teardown. Consequently, Teardown messages must be acknowledged—either with a Teardown Acknowledge, or an Error message. Un-acknowledged Teardown messages must be periodically repeated until they are acknowledged. Repeat Teardown messages must use the same Transaction ID as was used in the original Teardown message. Teardown messages may be considered to have been acknowledged on receipt of a Teardown Acknowledge or Error message with the Transaction ID used in the original Teardown.

2.7 LDP Error (FIG. 18)

The LDP Error message notifies a Label Switched Router (LSR) requesting a label bind of an error in processing the label bind request from the LSR.

Common Header: In the common header, type is set to 0xFF in this embodiment of the invention. Transaction ID is set equal to the Transaction ID in the message triggering the Error. Error messages may result from Label Bind and Teardown messages. Error messages are never returned in response to an Error message.

Error: Valid Error numbers are:

0x0001—Invalid Version

0x0002—Message garbled

0x0003—Unusable label

0x0004—Label in use

0x0005—No suitable ingress found

0x0006—locally configured maximum hop-count exceeded

0x0007—Unable to interpret MEE

0x0008—Invalid Label

0x0009—Authentication Failure

Label: When non-zero, it is used to indicate the label in a corresponding Label Bind or Teardown. This field is needed in order to allow for the correction of invalid Label Binds in a state-less Label Bind protocol. This label is used to find a LIB entry and remove the corresponding label—after which, the local LSR may make a local determination to retry.

Message Extension Elements (MEEs)

Errors resulting from inability to process an MEE should include offending MEEs. If the Error is "Unable to interpret MEE", the MEE may be truncated after the MEE header (with Length set to 0). After all included MEEs (if any), a Null MEE must be appended.

On receiving an Error message with a zero Transaction ID, the local LSR (Label Switched Router) removes the (non-zero) label associated with the interface on which the error was received and makes a local determination—based on Error code—as to whether or not to retry. In the event that the label removed was part of otherwise complete LIB entries, the local LSR must generate corresponding Error using downstream labels to appropriate downstream neighbors in the event that it is unable to act as ingress for the corresponding LSP (Label Switch Paths) and will not retry.

3. LDP State Transitions

The LDP State Transition message is used in proof of correctness for a protocol engine.

Typical LDP neighbor state transitions:

| State | Event | Action | New State |
| --- | --- | --- | --- |
| Down | NT Expires | Notify, Reset NT | Self Up |
| Down | Get Notify(+) | Notify, Reset NT | LDP Up |
| SelfUp | NT Expires | Notify, Reset NT | Self Up |
| SelfUp | Get Notify(+) | Notify, Reset NT | Self Up |
| SelfUp | Get Notify(*) | Reset NT | LDP Up |
| SelfUp | Get LDP Message | Notify, Reset NT | Self Up |
| LDP Up | NT Expires | Reset NT | Expired 1 |
| Expired 1 | NT Expires | Notify, Reset NT | Expired 2 |
| Expired 2 | NT Bxpires | Notify, Reset NT | Self Up |
| LDP Up | Get Notify(+) | Notify, Reset NT | LDP Up |
| LDP Up | Get LDP Message | Reset NT | LDP Up |
| Expired 1 | Get LDP Message | Reset NT | LDP Up |
| Expired 2 | Get LDP Message | Reset NT | LDP Up |

(*)Neighbor Notify containing the ID of the local LSR.
(+)Neighbor Notify not containing the ID of the local LSR.
NT — Neighbor Timer 4. LDP Interaction with Routine Routing protocols drive LDP (Label Distribution Protocol). Changes in how datagrams classified in a forwarding equivalency would be forwarded must result in new LDP associated with the new LSP to be established.

Routing protocols may produce temporary routing loops—loops which are potentially more severe given improved forwarding as a result of MPLS.

However, there are a few things that may be observed about this protocol as currently defined.

a) given that routing protocols are used to drive LDP in any particular LSR, this protocol converges as corresponding routing protocols converge;

b) routing changes driven by reachability advertisement tend to result in new Label Bind driving further Label Binds, thus increasing the likelihood that temporary loops in LDP will be detected via the hop-count mechanism;

c) the local focus with end-to-end effect in this specification tends to break LSPs in highly dynamic route-change scenarios (rather then twisting them together)—forcing traffic to be routed conventionally under these conditions and reducing the likelihood of looping LSPs;

d) the most likely scenarios in this specification for producing a loop are when performing upstream label allocation (as may be used for explicit route or multicast LSPs);

e) looping in an explicit route is impossible and this document includes recommended mechanisms for preventing other types of looping LSP formation.

5. LDP (Label Distribution Protocol) Multicast

The LDP Multicast message is used in setting up Multicast LSPs (Label Switch Paths) using an upstream allocation, and can be done using Bind Request messages including the appropriate Multicast FEC MEE (Message Extension Element). The Traversal List MEE message should be included in these Bind Request messages.

Determination of the paths to be used in any Multicast tree is accomplished locally by the individual Multicast capable LSRs (Label Switched Routers).

Where it might be impossible for the local LSR to determine which of its neighbors need to be included, that neighbor will know whether it needs to be in the specified Multicast tree and may reject Bind Requests using Label Bind messages with a Status code of 0x03. Hence, if any LSR (Multicast capable or not) is unable to determine which of its neighbors need to be part of a Multicast LSP, that LSR forwards appropriate Bind Requests to all of its neighbors, except the one from which it received the original one, and only returns a successful Label Bind when it receives a successful Label Bind from at least one downstream neighbor.

6. Security Considerations

When and where required, LDP messages may contain one or more Authentication MEEs. Processing such messages is contingent on successful Authentication. Failure to Authenticate results in an Error message (Label Bind) with an Error (Status) code of 9 (Authentication Failure).

Distribution of authentication keys used in comparison with the content of the Authentication MEE is outside the scope of this document.

7. Exemplary System Implementation Using a Local (Multicast) Unicast Router

Figure 19:
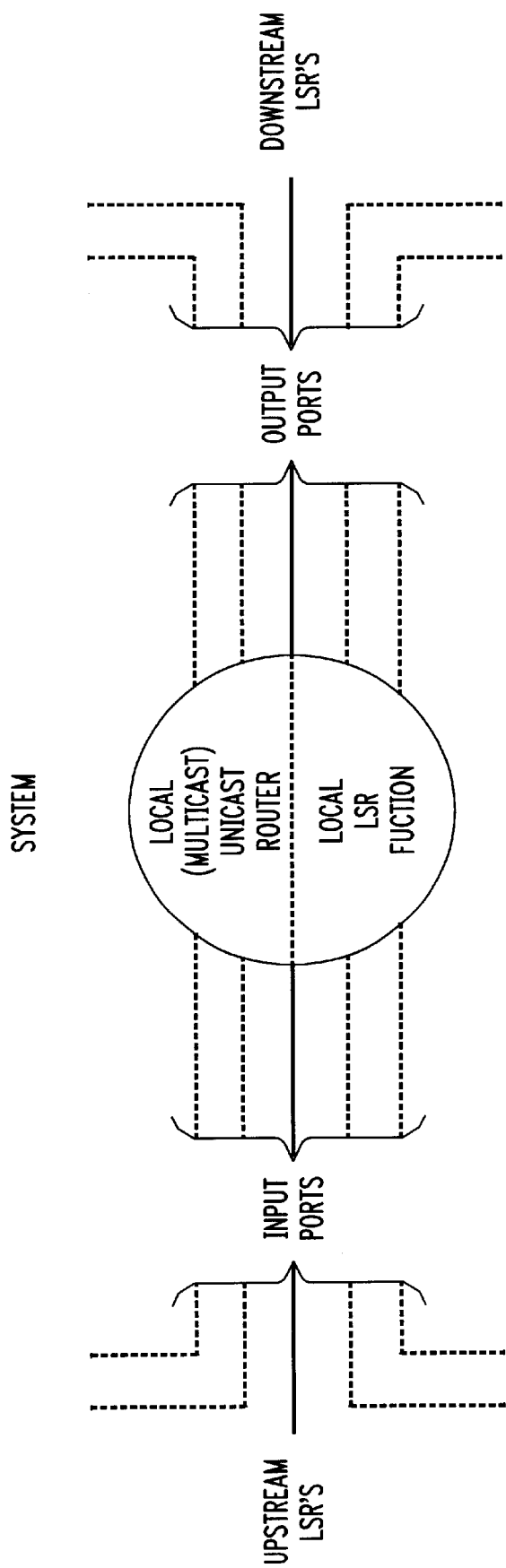
FIG. 19 shows in simplified form a system for implementing the generic label distribution protocol.

FIG. 19 shows a simplified representation of a system for implementing the generic label distribution protocol. As shown, upstream neighbors, for any given data path, can be either Label Switch Routers (LSRs) which are using labels negotiated with the local LSR or they are routers for which the local LSR may provide Label Switch Path (LSP) ingress. This can change relative to any one data path (or forwarding equivalency) during operation. Downstream neighbors relative to a forwarding equivalency are either LSRs which have provided labels that the local LSR may use for any LSP or they are routers to which the local LSR must provide egress. If any "LSP" equivalent routed path has a routing upstream and downstream neighbor, the local LSR simply routes data for this data path. Using this local perspective has two major advantages:

1) allows relatively simplistic protocol to control arbitrarily complex networks; and 2) reduces state maintenance overhead associated with end-to-end protocols (refresh, time-out, etc.).

While what has been described herein is the preferred embodiment of the invention, it will be apparent to those skilled in the art that numerous changes may be made without departing from the spirit and scope of the invention.

What is claimed is:

1. A method of increasing the efficiency of routing data packets between multiple routers in a network by adding a simple routing label to data packets being routed through said routers, said routing label being used to route said data packets between adjacent routers in said network that can handle said routing labels as well as conventional address labels that are attached to said data packets, said method comprising the steps of:

determining at each of said routers that can handle routing labels which adjacent routers in said network can place and process said routing labels on said data packets;

specifying at a first router of said routers that can handle routing labels, if required, a first portion of said routing label to be bound to and used to route each data packet that is originating at or passing through said first router to an adjacent one of said routers that handle routing labels;

sending said first portion of said routing label originating at said first router to said adjacent one of said routers that can handle routing labels to request a first label bind thereat;

specifying at one of said adjacent one of said routers, if required, a second portion of said routing label to be bound to and used to route each data packet that is originating at or passing through said first router and being directed to said adjacent one of said label routing routers;

sending said second portion of said routing label originating at said adjacent one of said label routing routers to said first router to be inserted into said routing label and used to route said data packet to said adjacent one of said label routing routers; and said routing labels being used by said adjacent label routing routers in lieu of conventional address headers to route data packets through said network; and by using said routing labels said last mentioned routers have more flexibility in routing data packets through said network and can use network links between said last mentioned routers that normally carry less traffic.

2. The method in accordance with claim 1 further comprising the steps of:

responding at an adjacent one of said label routing routers to said first portion of a routing label sent from said first router as a request for a label bind from another of said label routing routers that is not adjacent to said first router, but is adjacent to said adjacent one of said label routing routers, by forwarding said label bind request to said another of said label routing routers that is not adjacent to said first label routing router; and generating the second portion of said routing label at said another of said label routing routers that is not adjacent to said first label routing router and returning it via said adjacent label routing router to said first label routing router.

3. The method in accordance with claim 2 further comprising the steps of:

periodically sending a notification message from each of said routing label routers to all adjacent routing label routers and waiting for a reply from same indicating that they can handle routing label marked data packets; and removing routing labels at each of said routing label routers from data packets being routed to a specific, adjacent label router after a plurality of periodic notification messages are sent to said specific router and said reply is not received therefrom.

4. The method in accordance with claim 3 further comprising the step of sending a first teardown message from said first router to all adjacent routers to cease using routing labels when said first router will not process routing labels on data packets received from said adjacent routers.

5. The method in accordance with claim 4 further comprising the steps of:

sending a second teardown message from one of said label routing routers to an adjacent one of said label routing routers when a routing label originally sent from said adjacent one of said label routing routers to said one of said label routing routers is no longer required; and sending an acknowledgment from said adjacent one of said label routing routers that received said second teardown message to said one of said label routing routers responsive to said second teardown message.

6. The method in accordance with claim 5 further comprising the steps of:

checking at each of said label routing routers each routing label and label bind request received from an adjacent one of said label routing routers to determine if said last mentioned routing label is the same as previously used; and returning a first error message to the one of said label routing routers from which said routing label and label bind request is received if the routing label is the same as previously used.

7. The method in accordance with claim 6 further comprising the steps of:

removing said routing label attached to a stream of data packets at said first label routing router, at an adjacent one of said label routing router which assigned said last mentioned routing label to said first label routing router, before the stream of data packets travels on to another label routing router that is not adjacent to said first label routing router; and adding a different routing label onto said last mentioned stream of data packets received at said adjacent one of said label routing routers to replace the routing label removed thereat, said different routing label having been assigned by another label routing router adjacent to said last mentioned adjacent label routing router, but not adjacent to said first label routing router, and associated with routing labels assigned by said adjacent one of said label routing routers to said first label routing router and subsequently received.

8. The invention in accordance with claim 1 further comprising the steps of:

determining at a label routing router that has received a request from an adjacent label routing router to forward data packets to more than one other adjacent label routing router in a multicast distribution of said last mentioned data packets, which other adjacent label routing routers are to be included in the label requests and binds for those other adjacent label routing routers in order to forward the multicast data packets thereto;

binding routing labels to said last mentioned multicast data packets for routing same to label routing routers that are included in the multicast distribution of said last mentioned data packets; and sending said multicast data packets to said adjacent one of said routers that are included in the multicast distribution of said last mentioned data packets.

9. The invention in accordance with claim 1 further comprising the steps of:

receiving data packets at said first label routing router that are to be multicast via multiple ones of said adjacent, label routing routers;

binding appropriate labels to said multicast data packets at said first label routing router;

sending said multicast data packets with said appropriate routing labels bound thereto to all label routing routers adjacent to said first label routing router; and deciding at each of said last mentioned adjacent label routing routers if that router is part of the multicast distribution, forwarding said multicast data packets if the decision is yes, and not forwarding said multicast data packets if the decision is no.

* * * * *